F. LEADBEATER.
TROLLEY WHEEL.
APPLICATION FILED MAY 14, 1914.
1,125,569.
Patented Jan. 19, 1915.
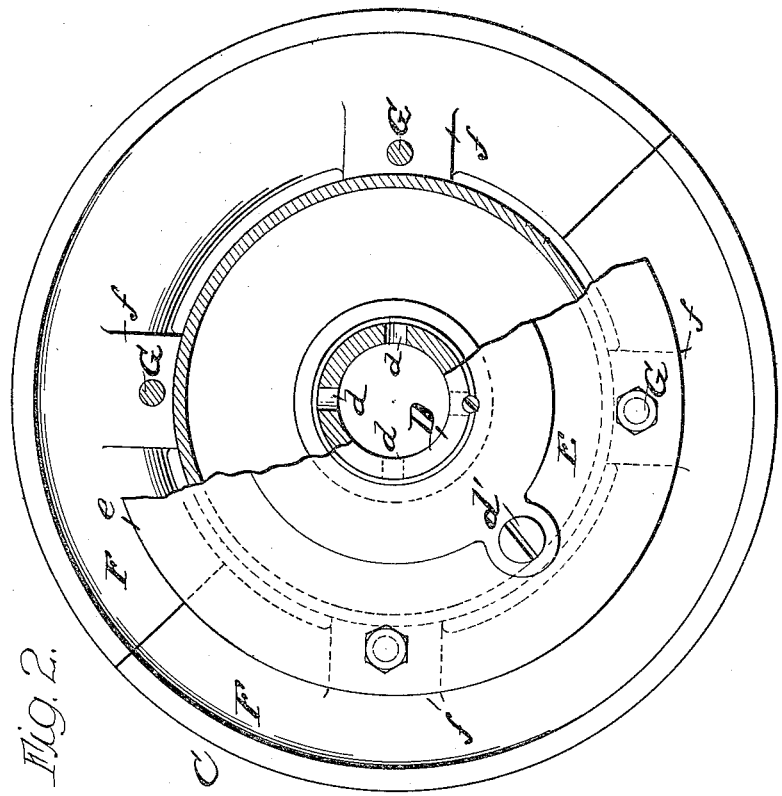
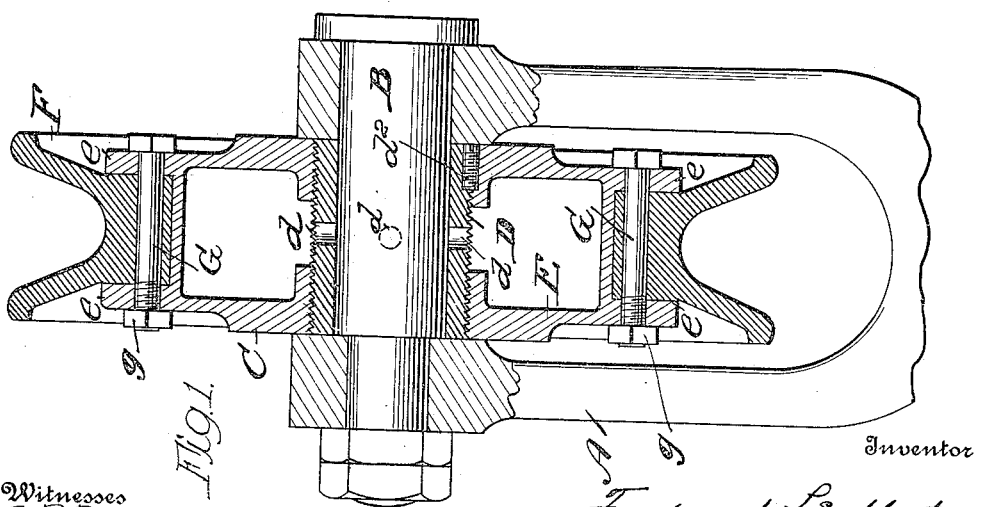
Witnesses
E. R. Barrett
S. M. Ebert
Inventor
Frederick Leadbeater
By S. E. Thomas
Attorney

UNITED STATES PATENT OFFICE.

FREDERICK LEADBEATER, OF DETROIT, MICHIGAN.

TROLLEY-WHEEL.

1,125,569.  Specification of Letters Patent.  Patented Jan. 19, 1915.

Application filed May 14, 1914. Serial No. 838,412.

Be it known that I, FREDERICK LEADBEATER, citizen of the United States, residing at Detroit, county of Wayne, State of Michigan, have invented a certain new and useful Improvement in Trolley-Wheels, and declare the following to be a full, clear, and exact description of the same, such as will enable others skilled in the art to which it pertains to make and use the same, reference being had to the accompanying drawings, which form a part of this specification.

My invention relates to an improvement in trolley wheels shown in the accompanying drawings and more particularly pointed out in the following specification and claim.

It is well known among operators of electric roads that the life of a trolley wheel is comparatively short, it being necessary to frequently replace the wheels with others on account of the rapid wearing away of the flanges and hub of the wheel through service.

It is therefore one of the objects of the present invention to construct a trolley wheel with a detachable rim and hub portion, that they may be replaced by like parts when worn. By this means a rim and hub portion may be employed formed of a metal offering great resistance to wear in combination with a body portion which may be made of a lower grade metal and thus materially reduce the cost of manufacture, without sacrificing the efficiency of the wheel.

Another feature of the invention consists in chambering the body portion to adapt it to receive a lubricant, providing an inlet port through which it may be filled and suitable discharge ports to deliver the lubricant upon the bearing.

Other advantages and improvements will hereafter appear.

In the drawing accompanying this specification:—Figure 1 is a cross sectional view through the wheel and its supporting harp, a fragmentary portion of the latter only being indicated. Fig. 2 is a side elevation of the wheel with parts broken away and in section.

Referring now to the letters of reference placed upon the drawings—A, denotes a trolley supporting harp, B, a shaft carried by the tines of the harp upon which is mounted the trolley wheel C.

D, indicates a hub portion or bushing, loosely sleeved upon the shaft B, having a screw-threaded engagement with the chambered body portion E.

$d$ are ports in the hub portion through which a suitable lubricant may pass from the chamber E, to the bearing. $d^1$ is a closure plug in the side wall of the body portion by removing which the chamber may be filled with lubricant.

$d^2$ denotes a screw-threaded key engaging the body and the hub portions to secure these parts against displacement when assembled.

F denotes a divided rim, preferably formed with a plurality of lugs $f$ adapted to enter the annular channel formed between the spaced flanges $e$, $e$, of the body portion E.

G indicates a series of bolts for securing the rim to the body of the wheel, and as shown in Fig. 1, one of the flanges $e$, may be tapered to receive the threaded end of the several bolts, the projecting ends of the bolts being engaged by lock nuts $g$, thus securing the parts against displacement when assembled.

Having indicated the several parts by reference letters its construction and operation will be readily understood.

Upon the rim becoming worn the bolts G, are removed releasing sections of the rim F, which is then replaced by another rim. If the hub portion D also shows wear, then it may be removed and replaced by a new hub—by first removing the screw-threaded key $d^2$ when the old hub may be unscrewed from the body portion.

Having thus described my invention, what I claim is:—

The combination in a trolley wheel, of a tubular hub having external screw threads formed thereon, a chambered body portion having threaded engagement with said hub, said hub and body portion having coöperating grooves therein adapted to register when the ends of the hub are flush with the opposite sides of said body portion, a fastening element disposed within the alining grooves for preventing the rotation of the hub relative to said body portion, said body portion having inwardly directed flanges formed upon the inner sides thereof and spaced apart to afford communication between the hub and the chambered portion of the body, said hub being provided with openings leading from the interior thereof into said chambered body portion between the flanges, the periphery of the chambered body portion having spaced circular flanges formed at the opposite sides thereof and forming an annular channel, a rim including a plurality of detachable sections disposed in said channel with the opposite sides thereof in engagement with the inner walls of the flanges forming the channel, lugs formed upon said rim and engaging the opposite sides and bottom of the channel, for retaining the inner side of the rim in spaced relation from the bottom of the channel, said lugs being spaced from the meeting ends of the sections of said rim, whereby said sections will be permitted a limited relative yielding movement and fastening devices passing through the flanges and lugs for retaining the rim within said channel.

In testimony whereof, I sign this specification in the presence of two witnesses.

FREDERICK LEADBEATER.

Witnesses:
SAMUEL E. THOMAS,
S. M. EBERT.

Copies of this patent may be obtained for five cents each, by addressing the "Commissioner of Patents, Washington, D. C."